Figure 4:
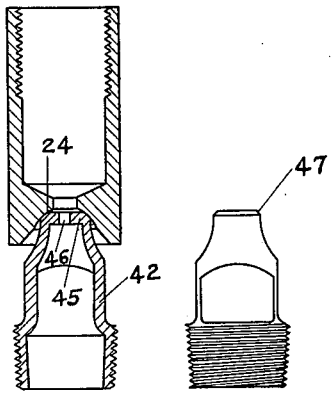

Nov. 20, 1928. 1,692,320
O. ZERK, NOW BY JUDICIAL CHANGE OF NAME O. U. ZERK
LUBRICATING APPARATUS
Filed Nov. 21, 1922 3 Sheets-Sheet 1
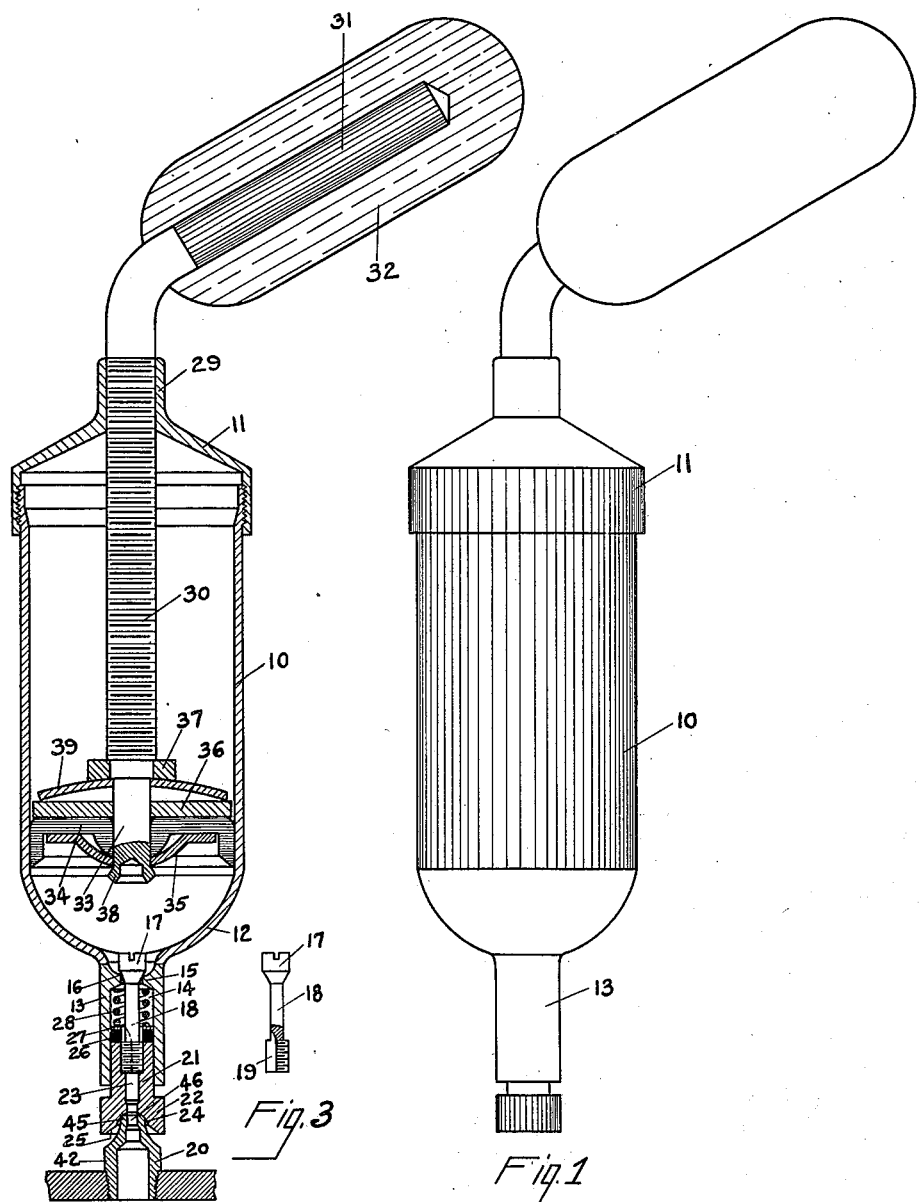
OSCAR ZERK INVENTOR.
BY Richey, Slough + Watts
HIS ATTORNEYS

OSCAR ZERK INVENTOR.

BY Richey, Slough + Watts

HIS ATTORNEYS

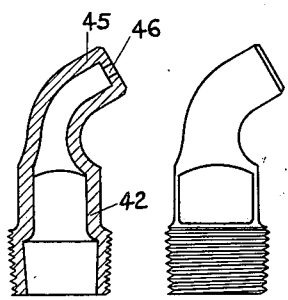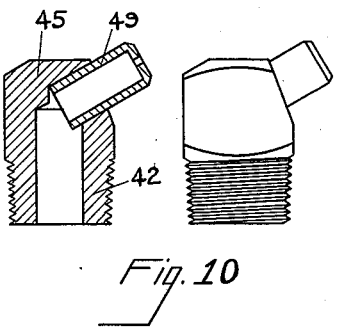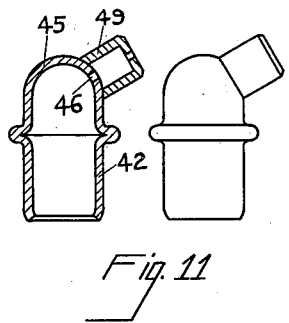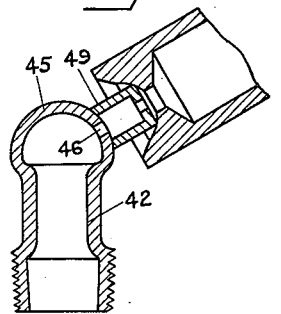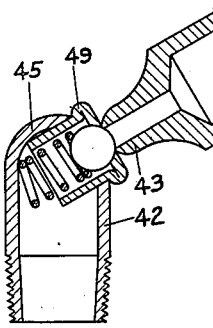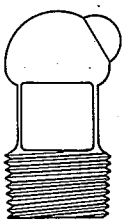

Patented Nov. 20, 1928.

1,692,320

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO ALEMITE MANUFACTURING CORPORATION, A CORPORATION OF DELAWARE.

LUBRICATING APPARATUS.

Application filed November 21, 1922. Serial No. 602,465.

In the lubrication of moving elements, and especially in automobiles, it has become uniform practise to provide the elements with inlet nipples, to which a grease or oil gun is detachably secured. Generally, the gun is provided with a flexible outlet tube having at its end a coupling which is adjusted manually and locked against the inlet nipple to provide a tight joint therebetween. After the user has locked the coupling by hand, he then grasps the gun barrel with one hand and with the other hand screws the plunger down, forcing the grease through the conduit.

These several operations each require considerable time, are often performed from awkward positions, and further, in handling the coupling, from which grease leaks during the pressure operation and especially after being removed, the user's hands become greasy and dirty causing the gun and the coupling to slip when handled, and necessitating additional time in which to perform the attaching and detaching operations. These conditions are objectionable to the user.

The main object of my invention resides in overcoming these objections by so constructing a pistol and a nipple, that the pistol can be held in one hand and placed in direct osculatory, leak proof contact with the nipple, and while so held will inject lubricant into the nipple, when direct pressure is applied thereto.

Another object of my invention resides in providing a pistol with a metal connector which is so shaped that it forms a leak proof direct metal to metal contact with a nipple.

Another object of my invention resides in constructing the contact surfaces of the nipple and the connector, so that a leak proof, direct knife edge contact can be manually maintained therebetween.

Another object of my invention is to construct the contacting surfaces of a nipple and a connector, so that one provides a peripheral circular edge which fits against a spherical surface of the other, to provide a leak proof contact therebetween, while held together in any angular relation in which the circular edge remains covered.

Another object of my invention resides in the construction of a lubricant dispensing pistol consisting of a barrel having pressure creating means associated therewith, a valve controlled lubricant exit, and a handle removed from the exit, whereby the user can grasp the pistol handle in one hand and by direct axial pressure, form a leak proof contact between the exit and a nipple, which contact will open the valve and allow the lubricant to pass under pressure from the pistol into the nipple.

Still another object of my invention is to provide a nipple with a pin point inlet opening, thereby eliminating the use of a closure member, such as is generally used with the present large inlet openings, to prevent dirt from entering and the lubricant escaping from the nipple.

Another object of my invention resides in providing a nipple with an inlet which is provided through the wall thereof at an angle of less than 90° to the axis thereof, thereby eliminating the use of a plurality of nipples, for bearings which are located in inaccessible positions.

The invention further resides and consists in the arrangement and combinations of parts hereinafter described and claimed, reference being had to the accompanying drawings wherein—

Figure 5:
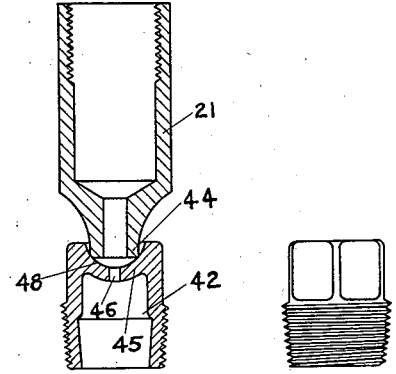
Figure 6:
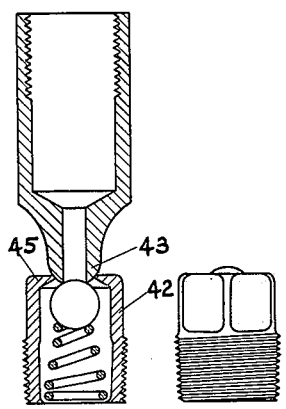
Figure 7:
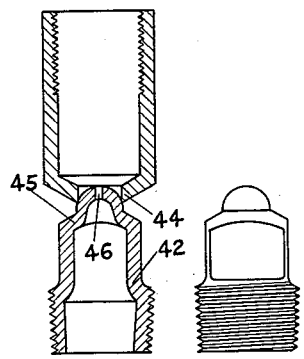
Figure 8:
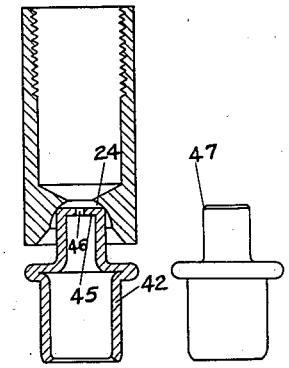

Fig. 1 is a side elevation of my assembled pistol; Fig. 2 is a longitudinal section of the same in osculatory contact with a nipple; Fig. 3 is a detail section of the connector; Fig. 4 is a side elevation of a nipple, and a longitudinal section of the same and of a connector in contact therewith; Fig. 5 is a side elevation of another form of nipple, and a longitudinal section of the same and of a connector in contact therewith; Fig. 6 is a side elevation of another form of nipple, and a sectional view of the same and a connector in contact therewith; Fig. 7 is a side elevation of another form of nipple, and a longitudinal section of the same and a connector in contact therewith; Fig. 8 is a side elevation of a nipple formed to be driven into a bearing, and a section of the same and of a connector in contact therewith; Fig. 9 is a side elevation of a nipple having an angular inlet, and a section of the same; Fig. 10 is a side elevation of a nipple having an inlet elbow secured therein at an angle, and a section of the same; Fig. 11 is another form of nipple, and a section of the same; Fig. 12 is a side elevation of another form of nipple, and a section of the same and of a connector in operative contact therewith; Fig. 13 is a side elevation of another type of nipple, is a section of the same and of a connector in contact therewith; Fig. 14 is a side elevation of still another type of nipple, and a section of the same and of a connector in contact therewith; and Fig. 15 is a side elevation of another type of nipple, and a section of the same and of a connector in contact therewith.

Referring to the drawings, in which like characters represent like parts, the grease containing receptacle may be formed in various well known ways. In my preferred embodiment, however, the receptacle consists of a short cylindrical barrel 10, one end of which is open and threaded exteriorly to receive the short closure cap 11, and the other end of which terminates in a restricted grease exit 12, to which a rigid cylindrical grease outlet nozzle 13 is rigidly secured by welding or other suitable means. The receptacle may be filled with grease when the cap 11 is unscrewed from the open end of the barrel in the usual manner.

The rigid nozzle extends centrally and longitudinally from the outlet end of the barrel, and is provided with a central passage 14 extending therethrough which is in communication with the grease exit 12, of the barrel. The inner end of the passage is restricted by a circular shoulder 15, the inner wall of which curves inwardly, and upwardly, forming a smooth junction with the curved inner wall of the grease exit 12, and providing a knife edge valve seat 16. The continuous curve thus formed within the receptacle, between the barrel and the valve seat, eliminates any corners or edges upon which grease can accumulate and permits the compressed grease to flush the valve seat of dirt and grit, insuring a leak proof closure. A valve member extends through the valve seat within the passage in the nozzle, and consists preferably, of a cylindrical and tapered head 17, which terminates in a stem 18. The stem is enlarged at its lower end and is threaded exteriorly. A longitudinally extending slot 19 is formed in the valve stem and its threaded end, and curves inwardly from the wall of the stem and substantially centrally through the threaded end thereof. The tapered portion of the head of the valve member extends into and forms a closure for the restricted portion of the passage in the nozzle, when it is seated against the circular knife edge of the valve seat.

A grease dispensing connector is mounted to reciprocate within the outer end of the passage in the nozzle, and forms the connection between the nipple 20, of the element to be lubricated, and the grease receptacle. The connector is provided with a cylindrical portion 21 which fits snugly within the passage in the nozzle, and with an integral head 22 of larger diameter which extends outside of the end of the nozzle, and stops the inward movement of the connector.

The cylindrical portion of the connector is of such length as to extend within only the outer portion of the nozzle, and is provided with a central passage 23 which terminates in a recess, formed preferably, in the end of the head thereof. The inner wall 24 of the recess is preferably spherical and the outer wall adjacent thereto tapers outwardly therefrom to the end of the head providing a circular guide, or finder 25, which will direct the nipple into the spherical portion of the recess. The inner end of the passage, in the connector, is threaded and receives the threaded end of the valve member, thereby forming an integral unit with the same. A grease proof leather washer 26 provided with a central aperture, through which the valve stem extends, is seated upon the inner end of the connector. A steel washer 27, provided with a central aperture through which the valve stem extends, rests upon the washer 26. A coil spring 28 is positioned between the shoulder 15 and the washer 27, within the passage in the nozzle to retain the grease proof washer in contact with the connector, and also, to normally keep the valve member seated upon the valve seat. When the valve is open the grease passes from the barrel, through the valve seat, and into the passage in the nozzle in which the spring lies. The washer 26 is formed of a compressible material so that the compressed lubricant passing through the central aperture therein will expand the washer and provide a tight fit thereof, against the wall of the nozzle passage, to prevent lubricant from working down between the outer wall of the connector and the nozzle. The valve being open, the compressed grease fills the passage in which the spring lies, and passes into the apertured space between the washers and the valve member, and then, into the slot 19 which overlies the passage 23 in the connector. The lubricant passes out through the passage 23 in the connector, where it is directed into the nipple through the osculating conduit formed by the spherical recess in the head of the connector and the contacting face of the nipple.

The cap 11 is provided with an internally apertured threaded bearing nipple 29, which receives the threaded piston rod 30. The outer end 31, of the piston rod is bent at an obtuse angle, and knurled longitudinally to provide a handle for the pistol, and an apertured grip 31 is driven thereon. This angular handle provides a grip which can be firmly grasped in one hand, and further, will allow the user to exert a maximum direct pressure against the pistol while so held, at arms length.

The inner end of the piston rod terminates in a cylindrical shank 38 upon which the apertured leak proof piston 34 is reciprocably secured. A washer 35 extends below the piston upon the shank 33, and a washer 36 extends above the piston upon the shank 33. At the upper end of the shank is rigidly secured a stop 37, which with the upset end 38 of the piston rod, secures the piston upon the shank, and allows a limited sliding movement thereof.

Suitable resilient means are provided between the stop 37 on the piston rod and the reciprocable piston but in my preferred embodiment, I use a stiff concavo-convex, resilient sheet metal washer 39, which is apertured centrally to fit upon the shank. It will be understood that, while I have illustrated only one such washer, several superposed washers of this type could be used for the same purpose. Normally, the resilient washer retains the piston at the outer end of the shank, but the concavo-convex metal washer will flatten out as the piston slides up upon the shank, during each inward manual operation of the piston rod, when the outlet valve is closed. When the valve is opened the compressed spring will resume its normal position and move the piston to the end of the piston rod.

Grease is forced from a container under high pressure and it is the present practise to mechanically secure the outlet of the gun to the nipple to prevent leakage, when placed in operative contact. It has also been found necessary to provide a gasket between the contacting faces of the coupling, as the metal to metal contact does not prevent leakage. In the several embodiments of my invention I illustrate a simple, and efficient solution, to the above practise and provide, generally, a nipple having a metal inlet contact face, and a metal connector carried by my pistol having an outlet contact face. Either of these faces is spherical and the other of these faces has a peripheral circular contact edge, which faces when manually pressed directly in contact form an osculatory, leak proof joint. The spherical face allows the opposing face to form a leak proof contact therewith, at various angular relations, as long as the inlet and outlet openings in the two faces are covered. Various modifications of contacting faces may be used to accomplish this result, and Figs. 4 to 15, illustrate various embodiments of this feature of my invention which are shown to a scale twice their size, for the purposes of illustration. The nipples may be described generally as comprising a hollow body portion 42, which is open at one end and provided with exterior threads, to engage a threaded opening in an element to be lubricated. In Figs. 8 and 11, the nipple wall is smooth and is adapted to be driven or pressed into an opening in an element to be lubricated.

It will be seen that the connector may be provided with a spherical recess in its contacting face, as previously described, or it may be formed with a spherical head 43, as shown in Figs. 6 and 15, or it may be formed as a straight or angular surface having a peripheral circular edge 44 as shown in Figs. 5, 7, 13 and 14.

Generally, the outwardly extending end of the nipple is closed by an end wall 45 which is perforated, to provide a pin point lubricant inlet opening 46. In Figs. 4 and 8 the end wall provides a straight face having a peripheral circular edge 47 which fits within the spherical recess in the outlet face of the connector. If desired, the circular edge 47 of the nipple may be slightly beveled to provide a larger contact surface with the spherical recess in the connector. Fig. 5 illustrates a nipple in which the end wall 45 is depressed to form a spherical recess 48 which receives the circular peripheral edge of the connector. Fig. 6 illustrates a conventional form of nipple with which my improved connector will operate, to form a leak proof contact. The connector, in this instance, is constructed at its end with a spherical surface 43 which is small enough to extend into the inlet opening and form a leak proof contact with the edge thereof. Fig. 7 illustrates another form of nipple in which the contact end 45 extends outwardly in spherical shape. In this modification the connector is provided with a tapered end which is provided with an outlet opening, into which the spherical extension of the nipple extends, forming a leak proof contact with the peripheral edge 44 thereof.

Very often the nipples must be secured in inaccessible places and it has been customary to provide a plurality of connected nipples to form angular extensions, or to provide the gun with a flexible conduit to reach such bearings. To meet such conditions I have provided nipples, as shown in Figs. 9 to 15, with the inlet opening 46 extending through the inlet end of the nipple, at an angle of substantially 60 degrees to the axis thereof. The nipples may have an angular end formed therewith, as shown in Fig. 9, or they may have a hollow inlet 49 secured thereto and extending at an angle therefrom, as shown in Figs. 10, 11, 12 and 15. The nipples illustrated in Figs. 9 to 12 are provided with an apertured contact face having a peripheral circular edge against which the spherical recess in the end of the connector is placed, to form a leak proof contact therebetween. In Fig. 14, I have illustrated a nipple having a spherical extension 50 provided with an inlet opening, over which the peripheral edge of the connector extends, to form a leak proof contact. In Fig. 13, the end of the nipple is provided with a spherical depressed recess 51, to receive the peripheral edge at the end of the connector, to form a direct leak proof contact therebetween.

It will now be seen, that in the several forms of nipples and connectors illustrated, there is always a spherical contact face and a peripheral circular edge, on the contact face of one or the other. This arrangement allows the connector to be held in contact, or moved while held in contact, in various angular relations with the nipple, and the leak proof contact can be maintained until either the inlet opening or the outlet opening in the contacting faces are uncovered.

Referring in particular to Figs. 2, 4, 8 and 9 to 12, it will be observed, that I have formed the nipple with an end face, having an inlet opening therein, which face is of such a diameter that the peripheral edge thereof will be enclosed by the spherical recess in the connector. The spherical recess of the connector, when not in use, remains filled with grease from the previous operation, and while being placed in contact with the nipple, such grease will bear against and flush the dirt and grit from the face of the nipple, due to the compression thereof and escape from the sides of the recess, while forming the contact. The grease thus escaping from between the contacting faces, will also flush the peripheral edge of the nipple and insure a clean contact with the connector.

The pistol and the dispensing connector form an integral unit which can be grasped in one hand by the user when applied to the nipple. While the pistol is not in use, the outlet valve in the nozzle is automatically closed by the spring 28. The piston rod is screwed into the barrel of the receptacle, to any desired degree, which operation flattens the resilient concavo-convex washer, as the piston pressing against the grease slides up upon the shank 32 thereof. When the pistol is thus charged, it is ready for operation, and the operator grasping the handle of the pistol in one hand, places the contacting face at the end of the connector against the contacting inlet face of the nipple forming a leak proof osculatory contact. The pistol is then pressed axially toward the nipple and the nozzle of the pistol slides toward the head of the connector, opening the outlet valve, and releasing the compressed grease, which automatically passes into the nipple. As the pistol is held in this position with pressure applied thereto, the valve remains open, and the flattened concavo-convex washer assumes its normal position moving the piston against the lubricant and forcing a predetermined quantity into the nipple. Pressure will thus be automatically applied against the grease, by the piston, until the resilient spring has resumed its normal position. It will be found that this spring provides sufficient pressure upon the grease for several lubricating operations, and also, that the spring can be compressed and released at any position of the piston within the barrel of the receptacle.

When the axial pressure is released, the outlet valve closes automatically. It will also be understood, that if desired, the pistol could be used to exert pressure against the grease by manual manipulation alone, after the osculatory contact is made between the dispensing connector and the nipple, and axial manual pressure is applied, as described, to press the pistol toward the nipple to open the valve.

The shape of the recess 23 within which the end of the nipple extends, allows the pistol to form an osculatory contact therewith, at any angular position thereto, while the end of the nipple remains covered by the spherical recess in the connector.

The pressure lubricating device has been designated as a pistol, for the reason that it can be held in one hand, either by the handle or by the receptacle, to form the contact with the nipple, and while so held, to inject lubricant into the nipple. It is also to be understood, that while I have referred to grease as the lubricant used with my pistol, that oil can be used therewith, if desired, just as efficiently.

From the foregoing it will be seen that my pistol can be placed in manual leak proof contact with a nipple, and lubricant dispensed thereto, while the pistol is gripped in one hand of the user.

Various changes can be made in the specific embodiment described, and shown in the drawings, without departing from the spirit of my invention and the scope of the appended claims.

What I claim is:—

1. A lubricating pistol for a contact pressure-lubricating system comprising a lubricant receptacle having an exit, a valve within said exit, a piston reciprocable within said receptacle, manually operable means for moving said piston to create pressure upon the lubricant within said receptacle, means for independently further moving said piston in the same direction to eject lubricant therefrom when said valve is open, and means for opening said valve by pressing said exit against the part to be lubricated.

2. A lubricating pistol for a contact pressure-lubricating system comprising a lubricant receptacle having an exit, a self closing valve in said exit, a piston reciprocable in said receptacle, manually operated mechanism for moving said piston to create pressure against the lubricant within said receptacle, resilient means compressed by said manual mechanism to further move said piston in the same direction against the lubricant when said manual mechanism is not in operation and when said valve is open, and means for opening said valve by pressing said exit against the part to be lubricated.

3. A lubricating pistol for a contact pressure-lubricating system comprising a lubricant receptacle having an exit, a valve in said exit, a piston movable in said receptacle to create pressure therein for ejecting the lubricant therefrom when said valve is open, means for moving said piston manually and automatically when said valve is open, and means for opening said valve by pressing said exit against the part to be lubricated.

4. A lubricating pistol for a contact pressure-lubricating system comprising a receptacle having a lubricant exit, a valve in said exit, a piston reciprocable in said receptacle to create pressure against the lubricant therein, manually operated mechanism for reciprocating said piston, and a concavo-convex resilient washer secured adjacent said piston and adapted to be compressed by each operation of said manual means to further reciprocate said piston when said manual means is not in operation and when said valve is open.

5. A lubricating pistol comprising a receptacle, a piston movable within said receptacle to exert pressure against the lubricant therein, a hollow outlet nozzle having a restricted opening therein, a valve cooperating with the restricted opening in said nozzle and having a slotted threaded stem depending therefrom, and a hollow connector reciprocably mounted within said nozzle and in open communication with the hollow nozzle through the slot in said valve stem, said connector having a threaded opening to receive the end of the threaded valve stem.

6. A lubricant compressor for a pressure-lubricating system and adapted to form a contact seal with the lubricant receptacle, comprising a rigid discharge conduit having means at its free end for making a sealed connection with said receptacle irrespective of the angle between said conduit and said receptacle, a piston in said barrel, manual means comprising a rotary drive element operable without axial force for moving said piston, said means including a resilient lost motion connection with said piston, and a check valve opening against the pressure of the lubricant by pressing said discharge conduit axially against said receptacle.

In witness whereof I have hereunto subscribed my name this 18th day of November, 1922.

OSCAR ZERK.